W. H. GILMOUR.
PORTABLE LIQUID SPRAYING APPARATUS.
APPLICATION FILED OCT. 14, 1914.
1,122,099.
Patented Dec. 22, 1914.
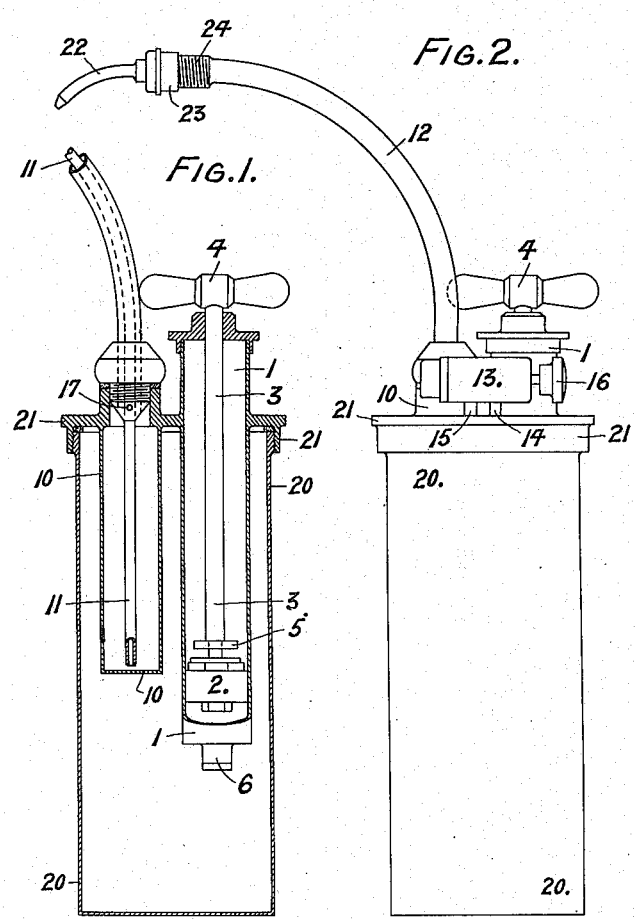
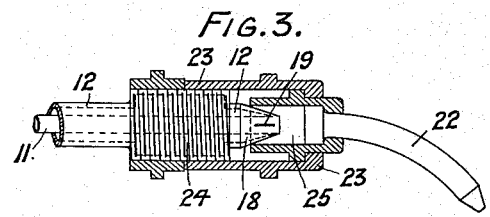

UNITED STATES PATENT OFFICE.

WILLIAM H. GILMOUR, OF LIVERPOOL, ENGLAND.

PORTABLE LIQUID-SPRAYING APPARATUS.

1,122,099.  Specification of Letters Patent.  Patented Dec. 22, 1914.

Application filed October 14, 1914. Serial No. 866,679.

*To all whom it may concern:*

Be it known that I, WILLIAM HENRY GILMOUR, a subject of the King of England, residing at 47 Rodney street, Liverpool, in the county of Lancaster, England, have invented new and useful Improvements in Portable Liquid-Spraying Apparatus, of which the following is a specification.

This invention has reference to liquid spraying apparatus, of the kind in which the liquid is forced out of the apparatus through a discharge nozzle or jet, by compressed air; and air also passes with the liquid so forced, and combines with the liquid in issuing from the apparatus, and by it, the liquid is atomized, and formed into a fine mist-like discharge. Apparatus of this kind are largely used by dentists and doctors, and others, for spraying or supplying a jet or stream of chemical substance or medium into the mouth or teeth, and other organs of the body; and the chief object of the present invention is to provide an improved apparatus of this kind, primarily, but not exclusively, for dentists' or doctors' use, which is simple, inexpensive, and at the same time, effective. Also in apparatus of this kind, there has been provided in combination, an air pump, fitting into a cylinder or chamber, into which it discharges air compressed by it; and in combination with this chamber or cylinder there has been provided a liquid containing cylinder or chamber, connected with the spraying portion, to which the air passes from the aforesaid cylinder or vessel, through a communicating pipe. And this air partly goes into the chamber containing the liquid and acts on its surface, or has to force it up the liquid discharge tube; and partly up through a pipe to a point near the discharge nozzle, where the air mixes with the liquid and atomizes or vaporizes it.

My invention consists in the general arrangement of parts and especially in provision of a regulating valve or cock and the particular arrangement of the liquid chamber.

The invention will be further described with the aid of the accompanying drawings which illustrate it, and in which—

Figure 1 is a vertical section through the air pump and water containing vessel; Fig. 2 is an outside elevation; while Fig. 3 shows a detail in section.

1 represents the air pump casing; 2 is the piston of it; 3 the piston rod; and 4 the handle for operating the rod and piston.

5 represents the air inlet valve, and 6 the discharge valve of the pump.

10 is the liquid containing vessel, 11 is the liquid discharge pipe dipping into it, and extending to its lower part; and 12 is the air supply pipe extending from the upper part of the chamber or vessel 10.

13 represents a valvular device, connected at one part by a pipe 14, with the air containing chamber 20, and by another pipe 15 with the upper part of the vessel 10. Both the vessel 10, and the air pump barrel extend into and fit within the vessel 20, which is preferably a cylinder, and constitutes the compressed air reservoir; and this liquid vessel 10, and the pump may advantageously be secured into the upper cover 21, which is separable from, and conveniently screwed on to the upper end of the cylinder 20, and sealed by a packing or washer between its upper edge and the cover.

The air pump is of the type in which the inlet valve 5 is fixed on the piston rod 3, and the rod is movable more or less in the piston; the valve 5 controlling passages through the piston. Thus, as the piston rod is pulled up, the valve 5 is moved off the apertures in the piston, and air can pass through them to the under side thereof; while when the piston rod is moved down, the valve 5 closes these passages, and air is compressed in the cylinder beneath the piston, and thrust out through discharge non-return valve 6, into the vessel 20. The valve 13 is placed so that when the apparatus is grasped by the right hand, the actuating head 16 of the valve within this case will just come opposite the thumb of the holder; and thus by pressing in the thumb the valve will be operated, and opened, and compressed air admitted to the valve case by the conduit 14, and delivered from the valve case to the vessel 10 by the pipe connection 15. Otherwise, the valve of the device which is a non-return valve, will be closed by a spring, and so air cannot pass from the vessel 20 to the vessel 10. The pressure of the air so admitted to the vessel 10, acting upon the surface of the liquid in it, forces this liquid by the pipe 11 through the discharge or nozzle end upon it; and some of this air passes by a small hole at 17 in the base of the air pipe 12 which it passes up to the conical end 18 of this pipe 12, at the apex of which, and within which, the water supply pipe 11 is fixed; and this conical end 18 is provided with a thin slit 19 through which air in regulated quantities is discharged; so that both liquid from the discharge surface of the pipe 11, the aperture of which may be of the diameter of a small needle, are discharged separately at the termini of the pipes 11, 12; and they pass into a socket piece 25, the inner edge of which fits over the base of the cone itself, and makes a close fit or joint with it. The air and liquid under pressure, combine and mix together in this mixing socket piece 25, and the air being restricted, the combining of the air and liquid in the manner desired is accomplished; and they pass together into the nozzle pipe 22, from the orifice of which (which may be again restricted) they pass together; the character of the liquid and air stream being of the desired kind. That is it produces a species of "boiling" spray, when it meets with resistance, as when being delivered into a confined space, as into a hollow tooth, or gum, or the like, which is effective and advantageous. The socket 25, with its nozzle pipe 22, are secured on to the pipe 12 by means of a threaded union ring 23 screwing on to a threaded neck ring 24, the end of the union 23 acting against a collar on the socket 25, so that it may swivel.

What is claimed is:—

1. A liquid spraying apparatus comprising in combination, a container vessel 20 constituting an air reservoir; an air pump 1 extending down into and disposed within said vessel, and having a hand operated part above its upper end; a separate liquid containing vessel 10, also extending down into and contained within the air vessel 20; an air pipe 12 leading from the upper part of the said liquid vessel 10, a liquid pipe 11 leading from the lower part of the said liquid vessel; a liquid spraying nozzle device on the outer end of the said liquid and air pipes; and a valvular device 13 adapted to be operated by the thumb or finger at the upper part of the apparatus, adapted to pass air from the air container to the liquid container; substantially as set forth.

2. In a liquid spraying apparatus, the combination of an air containing vessel 20; an air pump 1 extending down into said vessel; a separate liquid containing vessel 10, also extending down into the air vessel; an air pipe 12 leading from the upper part of the liquid vessel; a liquid pipe 11 leading from said liquid vessel; a mixing and spraying device on the end of said liquid and air pipes; and a swiveling discharge nozzle pipe 22 on said spraying device; substantially as set forth.

In testimony whereof I have signed my name to this specification in the presence of two subscribing witnesses.

W. H. GILMOUR.

Witnesses:
 FRANK E. FLEETWOOD,
 WM. J. HUMPHRIES.